3,733,321
1,4-BENZOTHIAZIN-3-ONES
John Krapcho, Somerset, N.J., assignor to E. R. Squibb & Sons, Inc., New York, N.Y.
No Drawing. Filed July 6, 1971, Ser. No. 160,066
Int. Cl. C07d 93/12, 87/00, 27/00
U.S. Cl. 260—243 R    2 Claims

ABSTRACT OF THE DISCLOSURE

Anti-inflammatory agents of the formula

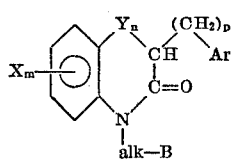
(I)

wherein X may be hydrogen, halogen, alkyl, haloalkyl, alkoxy, haloalkoxy, hydroxy, alkylthio, haloalkylthio, nitro, alkylsulfonyl, amino, alkanoylamino, or mono- or dialkylamino wherein any of the foregoing alkyl or substituted alkyl radicals may contain up to 8 carbon atoms; $m$ may be 0, 1, 2, 3 or 4; Y may be —O—, —S—, —SO—, —SO$_2$—, —CH$_2$—, or —CH$_2$CH$_2$—; $n$ may be 0 or 1; alk may be a straight or branched alkyl radical of up to 6 carbon atoms; B may be a basic nitrogen containing radical; $p$ may be 1, 2 or 3; and Ar may be phenyl, X-substituted phenyl, pyridyl, thienyl, furyl, naphthyl, or alkylenedioxyphenyl; and pharmaceutically acceptable acid-addition or quaternary ammonium salts thereof and N-oxides and pharmaceutically acceptable acid-addition salts thereof.

OBJECTS OF THE INVENTION

It is an object of the present invention to provide new anti-inflammatory agents. Another object is to provide a method for preparing these compounds. These and other objects of the present invention will be apparent from the following description.

DETAILED DESCRIPTION

The compounds of the present invention may be prepared by hydrogenating a compound of the formula

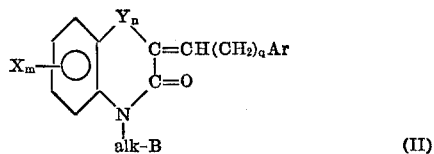
(II)

wherein X, $m$, Y, $n$, alk, B and Ar are as previously defined and $q$ is 0, 1 or 2. The preparation of compounds of the foregoing formula is disclosed in copending U.S. patent application Ser. No. 709,808, filed Mar. 1, 1968, now U.S. Pat. No. 3,635,956, and in copending U.S. patent application Ser. No. 35,590, filed May 7, 1970.

The compounds of Formula II wherein Y is sulfur may be prepared by reacting an o-aminobenzenethiol with a haloacetic acid, reacting the product IV with a haloalkylene-B compound, and reacting the product of the latter reaction V with an aldehyde as shown in the following reaction sequence wherein Y is sulfur, and X, $m$, alk, B, and Ar are as previously defined.

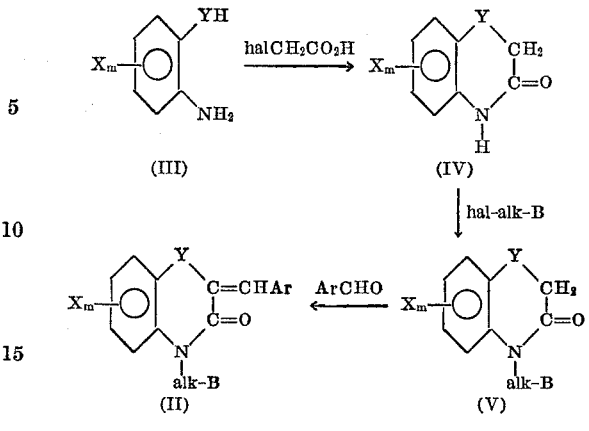

When Y is oxygen, the compounds of Formula I may be prepared by reacting an o-nitrophenol or an X$_m$-substituted o-nitrophenol with a haloacetic acid followed by reduction of the nitro group to an amino group. Cyclization takes place spontaneously following reduction to yield a compound of Formula IV which is then treated as described above for the sulfur analog.

The compound of Formula II which may be produced as shown above is then reduced, preferably by hydrogen in the presence of a catalyst, for example Pd-C.

Alternately, it is also possible to react a compound of Formula IV with an aldehyde of the formula ArCHO to yield a compound of the formula

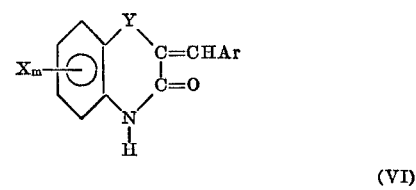
(VI)

The compound of Formula VI may then be hydrogenated and reacted subsequently with a haloalkylene-B compound to yield a compound of Formula I. The preparation of compounds of Formula VI is disclosed in copending U.S. patent application Ser. No. 709,808, filed Mar. 1, 1968, by John Krapcho, now U.S. Pat. No. 3,635,956.

Examples of suitable o-aminobenzenethiols which may be used as starting material in the foregoing reaction sequence are the following:

2-aminobenzenethiol;
4-fluoro-2-aminobenzenethiol;
5-fluoro-2-aminobenzenethiol;
3,5,6-trifluoro-2-aminobenzenethiol;
3,4,5,6-tetrafluoro-2-aminobenzenethiol;
4-chloro-2-aminobenzenethiol;
5-chloro-2-aminobenzenethiol;
6-chloro-2-aminobenzenethiol;
5-bromo-2-aminobenzenethiol;
5-methyl-2-aminobenzenethiol;
6-methyl-2-aminobenzenethiol;
5-ethyl-2-aminobenzenethiol;
5-n-propyl-2-aminobenzenethiol;
5-n-hexyl-2-aminobenzenethiol;
3-hydroxy-2-aminobenzenethiol;
5-methoxy-2-aminobenzenethiol;
3,4-dimethoxy-2-aminobenzenethiol;

5-ethoxy-2-aminobenzenethiol;
5-n-propoxy-2-aminobenzenethiol;
5-n-hexyloxy-2-aminobenzenethiol;
4-ethylthio-2-aminobenzenethiol;
4-(trifluoromethyl)-2-aminobenzenethiol;
5-(trifluoromethyl)-2-aminobenzenethiol;
6-(trifluoromethyl)-2-aminobenzenethiol;
5-(trifluoromethoxy)-2-aminobenzenethiol;
4-(trifluoromethylmercapto)-2-aminobenzenethiol;
5-(trifluoromethylmercapto)-2-aminobenzenethiol;
5-nitro-2-aminobenzenethiol;
6-nitro-2-aminobenzenethiol;
2,4-diamino-5-methylthiophenol;
5-dimethylamino-2-aminobenzenethiol;
4-methylsulfonyl-2-aminobenzenethiol.

Suitable o-nitrophenols which may be used as starting material in the foregoing reaction sequence are the following:

2-nitrophenol;
2-nitro-4-chlorophenol;
2-nitro-4,6-dichlorophenol;
2-nitro-3,4,5,6-tetrachlorophenol;
2-nitro-4-bromophenol;
2-nitro-3,5,-dibromophenol;
2-nitro-4,6-dibromophenol;
2,4-dinitrophenol;
2,5-dinitrophenol;
2,6-dinitrophenol;
2,4-dinitro-6-chlorophenol;
2,5-dinitro-4-chlorophenol;
2,6-dinitro-4-chlorophenol;
2,4-dinitro-6-bromophenol;
2,6-dinitro-4-bromophenol;
2,4,6-trinitrophenol;
2-nitro-6-methylphenol;
2-nitro-4-bromo-6-methylphenol;
2,4-dinitro-6-methylphenol;
2-nitro-3-methylphenol;
2-nitro-4-methylphenol;
2-nitro-5-methylphenol;
2,4,6-trinitro-5-methylphenol;
2-nitro-4-methyl-6-chlorophenol;
2-nitro-4-methyl-6-bromophenol;
2,5-dinitro-4-methylphenol;
2,6-dinitro-4-methylphenol;
2-nitro-4,5-dimethylphenol;
2-nitro-4,6-dimethylphenol;
2-nitro-3,4,6-trimethylphenol;
2,4-dinitro-3-i-propyl-6-methylphenol;
2-nitro-4-methylaminophenol;
2-nitro-5-chlorophenol;
2-nitro-5-fluorophenol;
2-nitro-4-fluorophenol;
2-nitro-5-bromophenol;
2-nitro-4-methylsulfonylphenol;
2-nitro-5-dimethylaminophenol;
2-nitro-5-ethylphenol;
2-nitro-5-n-hexylphenol;
2-nitro-5-methoxyphenol;
2-nitro-5-ethoxyphenol;
2-nitro-5-n-hexyloxyphenol;
2-nitro-5-(trifluoromethyl)phenol.

The corresponding sulfoxide and sulfone derivatives may be prepared by oxidizing a bivalent sulfur compound (wherein Y is S) to a sulfoxide or sulfone. The techniques for such oxidation are well known to those skilled in the art and involve the use of, for example, $H_2O_2$ or 1 equivalent of m-chloroperbenzoic acid (to form a sulfoxide) or $KMnO_4$ or 2 equivalents of m-chloroperbenzoic acid (to form a sulfone).

The compounds of Formula II wherein Y is —$CH_2$— or —$CH_2CH_2$—, or wherein $n$ is zero may be prepared, respectively, by substituting a dihydrocarbostyril of the formula

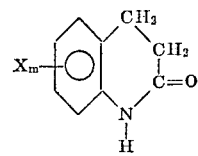

(VII)

or a tetrahydrobenzazepinone of the formula

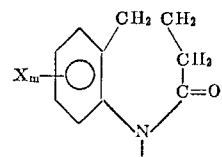

(VIII)

or a dihydroindolone of the formula

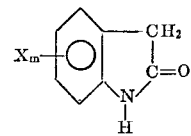

(IX)

for the compound of Formula IV in the foregoing reaction sequence.

The dihydroindolone, dihydrocarbostyril and tetrahydrobenzazepinone compounds may be prepared by reacting aniline or an $X_m$-substituted aniline with, respectively, α-chloroacetic acid, β-chloropropionic acid, and γ-chlorobutyric acid, and treating the resulting amide with $AlCl_3$ (Friedel-Crafts reaction) to effect ring closure. Examples of suitable substituted anilines which may be used as starting materials in the foregoing reaction sequence are the following:

2-methylaniline (o-toluidine),
3-methylaniline (m-toluidine),
4-methylaniline (p-toluidine),
2,3-dimethylaniline,
2,4-dimethylaniline,
2,5-dimethylaniline,
3,4-dimethylaniline,
3,5-dimethylaniline,
2-ethylaniline,
2-isopropylaniline,
4-n-butylaniline,
4-t-butylaniline,
2-fluoroaniline,
3-fluoroaniline,
4-fluoroaniline,
2-chloroaniline,
3-chloroaniline,
4-chloroaniline,
2-bromoaniline,
3-bromoaniline,
4-bromoaniline,
2-iodoaniline,
3-iodoaniline,
4-iodoaniline,
2,3-dichloroaniline,
2,4-dichloroaniline,
2,5-dichloroaniline,
3,4-dichloroaniline,
3,5-dichloroaniline,
2,3-dibromoaniline,
3,4-dibromoaniline,
3,5-dibromoaniline,
2,4-diiodoaniline,
2-methyl-3-chloroaniline,
2-methyl-4-chloroaniline,
2-methyl-4-bromoaniline,
2-chloro-4-methylaniline,
3-chloro-4-methylaniline,
2-bromo-4-methylaniline,
2-methoxyaniline, 4-methoxyaniline,
3,5-dimethoxyaniline,
4-ethoxyaniline,
2-chloro-5-methoxyaniline,
2-nitroaniline,
3-nitroaniline,
4-nitroaniline,
2,4-dinitroaniline,
2-nitro-4-chloroaniline,
3-nitro-4-chloroaniline,
2-chloro-4-nitroaniline,
2-chloro-5-nitroaniline,
2-bromo-4-nitroaniline,
2-nitro-4,5-dichloroaniline,
2,4-dinitro-5-chloroaniline,
2,4-dinitro-5-bromoaniline,
2,4-dinitro-3-methylaniline,
2,4-dinitro-5-methylaniline,
4-dimethylaminoaniline,
3-trifluoromethylaniline,
2-trifluoromethyl-4-nitroaniline,
2-nitro-4-trifluoromethylaniline,
2-methoxy-4-methylmercaptoaniline,
2-methylmercapto-4-methoxyaniline,
4-(n-butylsulfonyl)-2-aminoanisole,
4-(ethylsulfonyl)-2-aminoanisole,
2-ethylsulfonyl-5-trifluoromethylaniline, and
2-methoxy-4-ethylsulfonylaniline.

Among the suitable radicals represented by the basic nitrogen containing radical B are the following:

amino;
(lower alkyl)amino (e.g., N-methylamino);
di(lower alkyl)amino (e.g., N,N-dimethylamino);
(hydroxy lower alkyl)amino;
(hydroxylower alkyl) (lower alkyl)amino (e.g., N-2-hydroxyethyl-N-methylamino);
di(hydroxy lower alkyl)amino;
phenyl (lower alkyl)amino;

N-phenyl lower alkyl (lower alkyl)amino; and saturated 5- to 7-membered monocyclic heterocyclic radicals of less than twelve carbon atoms, as exemplified by:

piperidino;
(lower alkyl)piperidino;
di(lower alkyl)piperidino;
(lower alkoxy)piperidino;
homopiperidino;
2-, 3-, or 4-piperidyl;
2-, 3-, or 4-(N-lower alkyl piperidyl);
pyrrolidino;
(lower alkyl)pyrrolidino;
di(lower alkyl)pyrrolidino;
(lower alkoxy)pyrrolidino;
2- or 3-pyrrolidyl;
2- or 3-(N-lower alkyl pyrrolidyl);
morpholino;
(lower alkyl)morpholino;
di(lower alkyl)morpholino;
(lower alkoxy)morpholino;
thiamorpholino;
(lower alkyl)thiamorpholino;
di(lower alkyl)thiamorpholino;
(lower alkoxy)thiamorpholino;
piperazino;
4-R-substituted piperazino (e.g., $N^4$-ethylpiperazino, $N^4$-phenylpiperazino, and so forth);
di(lower alkyl)amino-(lower alkyl)piperazyl (e.g., $N^4$-dimethylaminoethylpiperazino);
(lower alkyl)piperazino (e.g., $N^4$-methylpiperazino);
di(lower alkyl)piperazino;
(lower alkoxy)piperazino;
homopiperazino; and
4-R-substituted homopiperazino (e.g., $N^4$-benzylhomopiperazino).

The aryl radical Ar may be phenyl, X-substituted phenyl, alkylenedioxyphenyl, pyridyl, furyl, naphthyl, or thienyl.

Examples of suitable benzaldehydes which may be reacted with compounds of Formula V to produce compounds of Formula IIa are the following:

o-chlorobenzaldehyde;
p-chlorobenzaldehyde;
p-fluorobenzaldehyde;
2,4-dibromobenzaldehyde;
2,4-dichlorobenzaldehyde;
2-6-dichlorobenzaldehyde;
2-bromo-4-chlorobenzaldehyde;
2,3,4,5,6-pentafluorobenzaldehyde;
2-hydroxybenzaldehyde (salicylaldehyde);
3-hydroxybenzaldehyde;
4-hydroxybenzaldehyde;
2,4-dihydroxybenzaldehyde (β-resorcylaldehyde);
2,5-dihydroxybenzaldehyde (gentisaldehyde);
3,4-dihydroxybenzaldehyde;
2-chloro-3-hydroxybenzaldehyde;
2-chloro-5-hydroxybenzaldehyde;
2-bromo-3-hydroxybenzaldehyde;
3-hydroxy-6-iodobenzaldehyde;
2,6-dichloro-3-hydroxybenzaldehyde;
4,6-dichloro-3-hydroxybenzaldehyde;
2,4,6-trichloro-3-hydroxybenzaldehyde;
2,4-dichloro-3-hydroxy-6-bromobenzaldehyde;
2-nitrobenzaldehyde;
3-nitrobenzaldehyde;
4-nitrobenzaldehyde;
3-hydroxy-4-nitrobenzaldehyde;
2-nitro-3-hydroxybenzaldehyde;
2-nitro-5-hydroxybenzaldehyde;
3-nitro-4-chlorobenzaldehyde;
2-methylbenzaldehyde (o-toluylaldehyde);
3-methylbenzaldehyde (m-methylbenzaldehyde);
4-methylbenzaldehyde (p-methylbenzaldehyde);
2-hydroxy-5-methylbenzaldehyde (homosalicylaldehyde);
2-hydroxy-3,5,6-trimethylbenzaldehyde;
2-methoxybenzaldehyde (o-anisaldehyde);
3-methoxybenzaldehyde;
4-methoxybenzaldehyde (p-anisaldehyde);
4-butoxybenzaldehyde;
2-hydroxy-3-methoxybenzaldehyde;
3,4-dimethoxybenzaldehyde (vertraldehyde);
3,4,5-trimethoxybenzaldehyde;
3-methoxy-4-hydroxybenzaldehyde (vanillin);
3-trifluoromethylbenzaldehyde;
3-methylthiobenzaldehyde;
4-ethylthiobenzaldehyde;
4-dimethylaminobenzaldehyde;
3,4-methylenedioxybenzaldehyde (piperonal);
3,4-ethylenedioxybenzaldehyde.

In addition to benzaldehydes, other aryl aldehydes which may be used in carrying out the present invention are 2-pyridinecarboxaldehyde, 3-pyridinecarboxaldehyde, 4-pyridinecarboxaldehyde, 2-thienylcarboxaldehyde, 3-thienylcarboxyaldehyde, α-furfural, α-naphthaldehyde, and β-naphthaldehyde.

The compounds of the invention may be obtained as mixtures of diasteroisomeric compounds when they contain more than one asymmetric atom. Such mixtures of racemates can then be separated into individual racemic compounds.

As to the salts, those coming within the purview of this invention include the acid-addition salts, particularly the pharmaceutically acceptable acid-addition salts, N-oxides and pharmaceutically acceptable acid-addition salts of N-oxides and pharmaceutically acceptable quaternary ammonium salts. Acids useful for preparing these acid-addition salt include, inter alia, inorganic acids, such as the hydrohalic acids (e.g., hydrochloric and hydrobromic acid), sulfuric acid, nitric acid, and phosphoric acid, and organic acids such as maleic, fumaric, tartaric, citric, acetic, benzoic, 2-acetoxybenzoic, salicylic, succinic acid, theophylline, 8-chlorotheophylline, p-aminobenzoic, p-acetamidobenzoic, nicotinic, methanesulfonic or cyclohexanesulfamic.

The N-oxide may be formed by dissolving the free base of Formula I in a solvent inert to hydrogen peroxide, e.g., acetic acid, ethanol or chloroform, adding excess (on a molar basis) hydrogen peroxide, and allowing the mixture to stand at room temperature for several hours. An acid-addition salt of the N-oxide may be formed by addition of the desired acid, for example, those mentioned above.

The quaternary ammonium salts include those formed with alkyl halides (e.g., methyl chloride, isobutyl bromide, dodecyl chloride and cetyl iodide), benzyl halides (e.g., benzyl chloride) and dilower alkyl sulfates (e.g., dimethyl sulfate).

The compounds of this invention are useful as anti-inflammatory agents are effective in the prevention and inhibition of granuloma tissue formation in warm blooded animals, for example in a manner similar to phenylbutazone or indomethacin. They may be used to decrease joint swelling, tenderness, pain and stiffness in mammalian species, e.g., in conditions such as rheumatoid arthritis. The compounds of this invention or a physiologically acceptable acid-addition salt thereof may be compounded according to accepted pharmaceutical practice for administration orally or by injection. Suitable oral dosage forms are tablets, capsules, elixirs, or powders, while solutions or suspensions are suitable for injection. The quantity administered may be from about 25 mg. to about 2 g. per day, and preferably from about 50 mg. to about 200 mg. per day.

The following examples illustrate the invention without, however, limiting the same thereto. All temperatures given are in degrees centigrade unless otherwise stated.

EXAMPLE 1

2-benzyl-4-[3-(dimethylamino)propyl]-2H-1,4-benzothiazin-3(4H)-one, hydrochloride A solution of 8.0 g. (0.021 mole) of 2-benzylidene-4-[3-(dimethylamino)propyl] - 2H-1,4 - benzothiazin-3(4H)-one, hydrochloride in 100 ml. of MeOH and 50 ml. of EtOH is treated with a slurry of 4 g. of 5% Pd/C catalyst in 50 ml. of EtOH and shaken on the Parr hydrogenator for 2 hours. The catalyst is filtered off, washed with EtOH, and the bulk of solvent evaporated. The oily residue is rubbed under ether and cooled overnight to give 6.3 g. of crude product; M.P. 124–126°. Following crystallization from 25 ml. of butanone, the colorless material weighs 4.6 g., M.P. 127–129°.

EXAMPLES 2–15

By reacting a substituted o-aminobenzenethiol of Formula III wherein the substituent(s) X is as indicated in Column I with chloroacetic acid, in the presence of a base, such as NaOH, there is obtained the correspondingly substituted benzothiazin-3-one of Formula IV. Reaction of the latter with the haloalkylene-B compound indicated in Column II yields the corresponding compound of Formula V. Refluxing the latter with benzaldehyde for 3–5 hours in a solvent such as DMF in the presence of a condensing agent such as sodium methoxide, or a solvent such as acetic anhydride in the presence of a condensing agent such as triethylamine or piperidine yields the product of Formula II wherein Ar is phenyl and $q$ is zero. This product is hydrogenated to yield the final product of Formula I wherein Y is S and $p$ is zero.

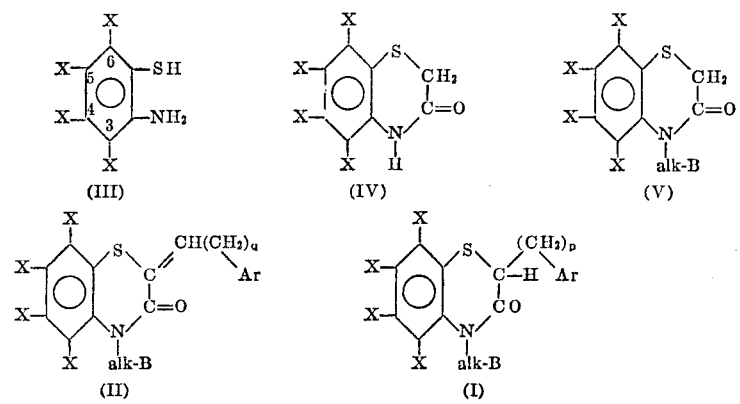

|  | (I) | | | | |
|---|---|---|---|---|---|
| Example | 3 | 4 | 5 | 6 | (II) |
| 2 | H | F | H | H | 2-(amino)ethyl chloride. |
| 3 | H | H | H | Cl | 2-(methylamino)ethyl chloride. |
| 4 | H | H | Br | H | 2-(diethylamino)ethyl chloride. |
| 5 | H | H | $CH_3$ | H | 2-methyl-3-(dimethylamino)propyl chloride. |
| 6 | H | H | H | $C_2H_5$ | 6-(dimethylamino)hexyl chloride. |
| 7 | H | $CF_3$ | H | H | 2-[N-methyl-N-(2-hydroxyethyl)amino]ethyl chloride. |
| 8 | H | H | n-$C_5H_{11}$ | H | 2-[bis-N-(2-hydroxyethyl)amino]ethyl chloride. |
| 9 | OH | H | H | H | 3-(benzylamino)propyl chloride. |
| 10 | H | S$C_2H_5$ | H | H | 3-(N-phenethyl-N-methylamino)propyl chloride. |
| 11 | H | H | H | $NO_2$ | 2-(piperidino)ethyl chloride. |
| 12 | H | $CH_3SO_2$ | H | H | 2-(2-methylpiperidino)ethyl chloride. |
| 13 | H | $NH_2$ | $CH_3$ | H | 2-(2,6-dimethylpiperidino)ethyl chloride. |
| 14 | H | $OCH_3$ | $OCH_3$ | H | 2-(2-ethoxypiperidino)propyl chloride. |
| 15 | H | H | $N(CH_3)_2$ | H | 2-(hexamethyleneamino)propyl chloride. |

EXAMPLES 16–29

By reacting the compound of Formula V of Examples 2–15 in Column I with the aldehyde indicated in Column II, there is obtained the corresponding compound of Formula II wherein Ar is as indicated in Column III and $q$ is zero except for Example 18 wherein $q$ is 2 and Example 23 wherein $q$ is 1. Catalytic hydrogenation of the compounds of Formula II yields the corresponding compound of Formula I.

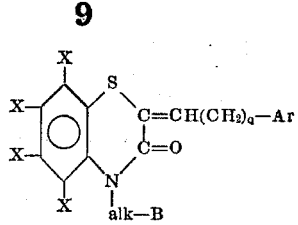

| Example | Compound of Formula V of Example— | (I) Aldehyde | (II) | (III) R |
|---|---|---|---|---|
| 16 | 2 | p-Chlorobenzaldehyde | | —C₆H₄—Cl |
| 17 | 3 | Phenylacetaldehyde | | —CH₂—C₆H₅ |
| 18 | 4 | Phenylpropionaldehyde | | —CH₂CH₂—C₆H₅ |
| 19 | 5 | 4-pyridinecarboxaldehyde | | 4-pyridyl |
| 20 | 6 | 3-pyridinecarboxaldehyde | | 3-pyridyl |
| 21 | 7 | m-Trifluoromethylbenzaldehyde | | m-CF₃-C₆H₄— |
| 22 | 8 | 2-pyridinecarboxaldehyde | | 2-pyridyl |
| 23 | 9 | 4-chlorophenylacetaldehyde | | —CH₂—C₆H₄—Cl |
| 24 | 10 | 2-thiophenecarboxaldehyde | | 2-thienyl |
| 25 | 11 | Furane-2-carboxaldehyde | | 2-furyl |
| 26 | 12 | Naphthalene-1-carboxaldehyde | | 1-naphthyl |
| 27 | 13 | Naphthalene-2-carboxaldehyde | | 2-naphthyl |
| 28 | 14 | 2-methylbenzaldehyde | | o-CH₃-C₆H₄— |
| 29 | 15 | m-Bromobenzaldehyde | | m-Br-C₆H₄— |

EXAMPLE 30

3-benzyl-1-[3-(dimethylamino)propyl]-2-indolinone, hydrochloride

A warm solution of 11.0 g. of 3-benzylidene-1-[3-(dimethylamino)propyl]-2-indolinone, hydrochloride in 200 ml. of ethanol is hydrogenated in the same manner as in Example 1 to give 10.8 g. of colorless product, M.P. 188–190°. After crystallization from 30 ml. of ethanol, the product weighs 9.4 g., M.P. 188–190°.

EXAMPLES 31–61

Following the procedure of Examples 2–15 but substituting for the o-aminobenzenethiol the o-nitrophenol of Formula III wherein the substituent(s) X is as indicated in Column I, reducing the nitro group after reacting the o-nitrophenol with chloroacetic acid, employing the chloride of the haloalkylene radical indicated in Column II, and substituting for benzaldehyde the carboxaldehyde of the radical Ar in Column III, there is obtained the product of Formula II wherein $q$ is zero (except for Example 52 wherein $q$ is 2) which is catalytically hydrogenated to yield the final product of Formula I wherein Y is O, $p$ is zero (except for Example 52 wherein $p$ is 3), and Ar is the radical indicated in Column III.

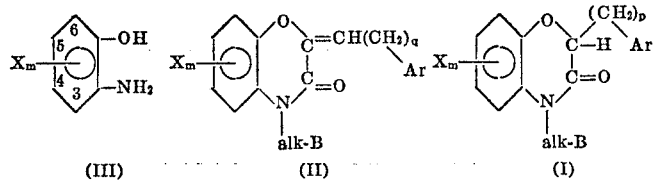

| | (I) | | | (II) | (III) |
|---|---|---|---|---|---|
| 3 | 4 | 5 | 6 | Alk-B halide | Ar |
| 31 | Cl | | | Cl | 2-(2-piperidyl)ethyl | -⟨◯⟩-CH₃ (CH₃ at ortho) |
| 32 | Br | | Br | | 3-(3-piperidyl)propyl | -⟨◯⟩-CH₃ |
| 33 | CH₃ | | | | 2-(4-piperidyl)ethyl | -⟨◯⟩-Cl |
| 34 | | | | CF₃ | 2-(1-methyl-2-piperidyl)ethyl | -⟨◯⟩-NO₂ (NO₂ ortho) |
| 35 | | | | n-C₃H₇ | 3-(1-methyl-3-piperidyl)propyl | -⟨◯⟩ (NO₂ ortho, NO₂ para) |
| 36 | | | | Cl | 4-(1-methyl-4-piperidyl)butyl | -⟨◯⟩-OH |
| 37 | | F | | | 3-(pyrrolidino)-propyl | -⟨◯⟩-OH |
| 38 | | | | CH₃ | 2-(2-methylpyrrolidino)ethyl | -⟨◯⟩-OH |
| 39 | | | | OCH₃ | 2-(2,5-dimethylpyrrolidino)ethyl chloride | -⟨◯⟩-NH₂ |
| 40 | Cl | Cl | Cl | Cl | 3-(3-ethoxypyrrolidino)propyl | -⟨◯⟩ (NH₂ ortho) |
| 41 | | Br | | | 2-(2-pyrrolidyl)ethyl | -⟨◯⟩ (H₃C ortho) |
| 42 | | Br | | Br | 2-(3-pyrrolidyl)ethyl | -⟨◯⟩ (Cl ortho) |
| 43 | | SC₂H₅ | | | 2-(N-methyl-2-pyrrolidyl)ethyl | -⟨◯⟩ (Cl ortho) |
| 44 | | Br | | Br | 3-(N-methyl-3-pyrrolidyl)propyl | -⟨◯⟩ (Br ortho) |
| 45 | | Br | | CH₃ | 2-(morpholino)ethyl | -⟨◯⟩ (Br ortho) |
| 46 | CH₃ | | | | 3-(2-methylmorpholino)propyl | -⟨◯⟩-Br |

3,733,321

TABLE—Continued

| | (I) | | | (II) | (III) |
|---|---|---|---|---|---|
| 3 | 4 | 5 | 6 | Alk-B halide | Ar |
| 47 | | CH₃ | | 3-(2,6-dimethylmorpholino)propyl | -C₆H₄-NO₂ |
| 48 | | CH₃ | | 3-(3-methoxymorpholino)propyl | -C₆H₄-NO₂ |
| 49 | | CH₃ | | Cl 2-(thiamorpholino)ethyl | -C₆H₄-NO₂ |
| 50 | | CH₃ | | Br 3-(piperazino)ethyl | -C₆H₄-OCH₃ |
| 51 | | N(H)(CH₃) | | 3-(4-methylpiperazino)propyl | -C₆H₄-NH₂ |
| 52 | | | | Cl 3-(4-n-propylpiperazino)propyl | -CH₂CH₂-C₆H₅ |
| 53 | | | | F 3-(4-phenylpiperazino)propyl | -C₆H₄-OH |
| 54 | | SO₂CH₃ | | 2-(4-benzylpiperazino)ethyl | -C₆H₄-OCF₃ |
| 55 | | N(CH₃)₂ | | 3-(4-phenethylpiperazino)propyl | -C₆H₄-CF₃ |
| 56 | | C₂H₅ | | 3-[4-(α-dimethylaminoethyl)piperazino]propyl | -C₆H₄-CH₃S |
| 57 | | OC₂H₅ | | 3-(2-methylpiperazino)propyl | -C₆H₄-SO₂C₂H₅ |
| 58 | | O-n-C₅H₁₁ | | 3-(2,6-dimethylpiperazino)propyl | -C₆H₄-NHCOCH |
| 59 | CH₃ | | | 3-(3-methoxypiperazino)propyl | -C₆H₄-NHCH₃ |
| 60 | | CH₃ | | 2-(morpholino)ethyl | -C₆H₄-N(C₂H₅) |
| 61 | | CH₃ | | 3-(piperazino)ethyl | -C₆H₄-SCF₃ |

EXAMPLE 62

2-benzylidene-4-[3-(dimethylamino)propyl]-2H-1,4-benzothiazin-3(4H)-one-1-oxide, hydrochloride By treating the product from Example 1 with a chloroform solution containing one equivalent of m-chloroperbenzoic acid and allowing the mixture to stand for about 2 hours at room temperature, the title product is obtained.

EXAMPLE 63

2-benzylidene - 4 - [3 - (dimethylamino)propyl]-2H-1,4-benzothiazin-3(4H)-one-1,1-dioxide, hydrochloride By refluxing the product from Example 1 with two equivalents of a chloroform solution of m-chloroperbenzoic acid, the title product is obtained.

EXAMPLES 64–69

Following the procedure of Example 62 but substituting, respectively, for the product of Example 1 the final product of Examples 2, 5, 7, 9, 11 and 15, there is obtained, respectively, the corresponding sulfoxide.

EXAMPLES 70–74

Following the procedure of Example 63 but substituting, respectively, for the product of Example 1 the final product of Examples 3, 6, 10, 12 and 14, there is obtained, respectively, the corresponding sulfone.

EXAMPLE 75

3-(p-methyl)benzyl-1-[3-(dimethylamino)propyl]-2-indolinone, hydrochloride

Aniline is reacted with α-chloroacetic acid in known manner to produce an amide of the formula

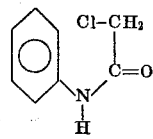

which is then condensed with AlCl₃ in known manner to form the dihydroindolone of the formula

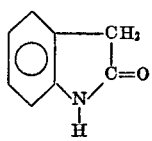   5 which is then reacted with 2-(diethylamino)ethyl chloride to form the compound of the formula

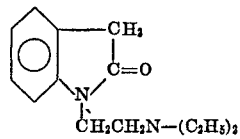

Reaction of the latter with p-methylbenzaldehyde according to the procedure of Examples 2–15 yields the compound of the formula

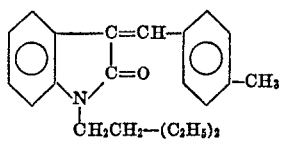

The latter compound is catalytically hydrogenated to yield the final compound of the formula

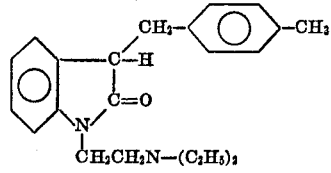

EXAMPLES 76–87

Following the procedure of Example 75 but substituting for aniline the substituted aniline in Column I, and substituting for benzaldehyde the carboxaldehyde of the radical listed in Column III there is obtained the compound of the formula

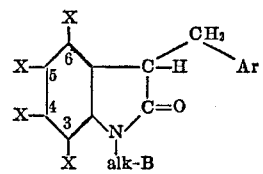

wherein the substituents in the 3-, 4-, 5- or 6-positions are those indicated in Column II, and Ar is the radical indicated in Column III:

| Example | (I) | (II) 3 | 4 | 5 | 6 | (III) |
|---|---|---|---|---|---|---|
| 76 | 2-methyl | CH₃ | | | | 4-Br, 3-Cl-phenyl |
| 77 | 3-fluoro | F | | | | 4-HO-phenyl |
| 78 | 4-chloro | | | Cl | | 4-NO₂-phenyl |
| 79 | 3,5-dimethyl | CH₃ | | CH₃ | | 4-CH₃-phenyl |
| 80 | 2-bromo | Br | | | | 4-CH₃-phenyl |
| 81 | 4-iodo | | I | | | 4-CH₃O-phenyl |
| 82 | 2-methoxy | OCH₃ | | | | 4-OCH₃-phenyl |
| 83 | 4-methoxy | | OCH₃ | | | 4-OC₄H₉-phenyl |
| 84 | 3,5-dimethoxy | OCH₃ | | OCH₃ | | 4-CF₃-phenyl |
| 85 | 3-nitro | NO₂ | | | | 4-SCH₃-phenyl |
| 86 | 4-dimethylamino | | | | N(CH₃)₂ | 4-N(CH₃)₂-phenyl |
| 87 | 3-trifluoromethyl | CF₃ | | | | 4-SC₂H₅-phenyl |

EXAMPLES 88-97

Following the procedure of Examples 76-87 but employing the acid indicated in Column I in place of α-chloroacetic acid, and employing the chloride of the alk-B radical indicated in Column II in place of 2-(diethylamino)ethyl chloride, and employing the carboxaldehyde of the radical indicated in Column III in place of benzaldehyde, there is obtained the compound of the formula

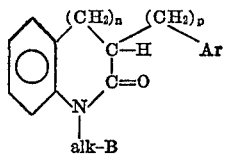

wherein alk-B is the radical indicated in Column II, Ar is the radical indicated in Column III and $n$ and $p$ are as indicated in Column IV.

EXAMPLE 98

2-benzyl-4-[3-(dimethylamino)propyl]-2H-1,4-benzothiazin-3(4H)one, N-oxide

A solution of the free base of Example 1 in acetonitrile is treated with two equivalents of $H_2O_2$ in acetic acid and the solution allowed to stand at room temperature for 8 hours. The solvent is removed to give the title product.

EXAMPLE 99

2-benzyl-4-[3-(dimethylamino)propyl]-2H-1,4-benzothiazin-3(4H)one, methobromide

A solution of the free base of Example 1 in acetonitrile is treated with two equivalents of methyl bromide and the solution allowed to stand at room temperature for 8 hours. The solvent is removed to give the title product.

EXAMPLE 100

Oral tablet

The following ingredients are thoroughly mixed in a Hobart blender:

|  | G. |
|---|---|
| 2-benzyl - 4 - [3-(dimethylamino)-propyl]-2H-1,4-benzothiazin-3(4H)-one, hydrochloride | 15.0 |
| Corn starch | 16.9 |
| Lactose | 120.0 |
| Magnesium stearate | 1.5 |
| Avicel (microcrystalline cellulose) | 33.8 |

The blended mixture is then compressed into tablets in normal manner to make 300 tablets each containing 50 mg. of active ingredient.

said dieffrence in solubility depends considerably on the

|  |  |  |  | (IV) | |
|---|---|---|---|---|---|
| Example | (I) | (II) | (III) | $n$ | $p$ |
| 88 | β-Chloropropionic acid | 2-(ethylamino)ethyl | Cl-⟨O⟩- | 1 | 1 |
| 89 | do | 2-ethyl-3-(diethylamino) propyl | $-CH_2CH_2-$⟨O⟩ | 1 | 3 |
| 90 | do | 2-(2-ethylpiperidino)ethyl | $-CH_2-$⟨O⟩ | 1 | 2 |
| 91 | do | 2-(2-piperidyl)ethyl | $-CH_2-$⟨O⟩-Cl | 1 | 2 |
| 92 | do | 3-(3-pyrrolidino)propyl | $-CH_2-$⟨O⟩ | 1 | 2 |
| 93 | γ-Chlorobutyric acid | 2-(2-ethoxypiperidino)propyl | $-CH_2CH_2-$⟨O⟩ | 2 | 3 |
| 94 | do | 2-(3-pyrrolidyl)ethyl | -⟨O⟩-Cl | 2 | 2 |
| 95 | do | 2-(morpholino)ethyl | $-CH_2CH_2-$⟨O⟩ | 2 | 3 |
| 96 | do | 2-(thiamorpholino)ethyl | $-CH_2-$⟨O⟩ | 2 | 2 |
| 97 | do | 3-(4-phenethylpiperazino)propyl | $-CH_2-$⟨O⟩-Cl | 2 | 2 |

What is claimed is:
1. A compound of the formula

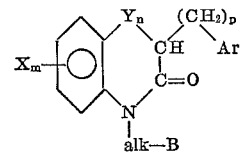

wherein X may be hydrogen, halogen, alkyl, haloalkyl, alkoxy, haloalkoxy, hydroxy, alkylthio, haloalkylthio, nitro, alkylsulfonyl, amino, alkanoylamino, or mono- or dialkylamino wherein any of the foregoing alkyl or substituted alkyl radicals may contain up to 8 carbon atoms; $m$ may be 0, 1, 2, 3 or 4; Y may be —S—, —SO—, or —$SO_2$—; $n$ may be 0 or 1; alk may be a straight or branched alkyl radical of up to 6 carbon atoms; B may be NH₂, an alkylamino, dialkyl amino, hydroxyalkylamino, (hydroxyalkyl)(alkyl)amino, di(hydroxyalkyl)amino, the alkyl radical in any of the foregoing radicals being from 1 to 6 carbons, or phenylalkylamino, or N-alkylphenylalkylamino wherein the alkyl radical has 1 or 2 carbons, or a saturated 5 to 7 membered monocyclic heterocyclic radical of less than 12 carbon atoms selected from the group consisting of piperidino, (lower alkyl)piperidino, di(lower alkyl)piperidino, (lower alkoxy)piperidino, homopiperidino, 2-, 3- and 4-piperidyl, 2-, 3- and 4-(N-lower alkyl)piperidyl, pyrrolidino, (lower alkyl)pyrrolidino, di(lower alkyl)-pyrrolidino, (lower alkoxy)pyrrolidino, 2- and 3-pyrrolidyl, 2- and 3-(N-lower alkyl)pyrrolidyl, morpholino, (lower alkyl)morpholino, di(lower alkyl) morpholino, (lower alkoxy)morpholino, thiamorpholino, (lower alkyl)-thiamorpholino, di(lower alkyl)thiamorpholino, (lower alkoxy)thiamorpholino, piperazino, N⁴-(lower alkyl)-piperazino, N⁴-phenyl-piperazino, di(lower alkyl)amino - (lower alkyl)piperazyl, (lower alkyl)piperazino, di(lower alkyl)piperazino, (lower alkoxy)piperazino, homopiperazino, and N⁴-benzylhomopiperazino; $p$ may be 1, 2 or 3; and Ar may be phenyl, X-substituted phenyl, pyridyl, thienyl, furyl, naphthyl, methylenedioxyphenyl or ethylenedioxyphenyl; and pharmaceutically acceptable acid-addition or quaternary ammonium salts thereof and N-oxides and pharmaceutically acceptable acid-addition salts thereof.

2. A compound according to claim 1 having the name 2-benzyl-4-[3-(dimethylamino)propyl] - 2H - 1,4-benzothiazin-3(4H)-one.

References Cited
UNITED STATES PATENTS

| | | | |
|---|---|---|---|
| 3,166,554 | 1/1965 | Krapcho | 260—243 |
| 3,401,166 | 9/1968 | Krapcho | 260—243 |
| 3,471,481 | 10/1969 | Krapcho | 260—243 X |
| 3,535,338 | 10/1970 | Krapcho | 260—243 X |

JOHN M. FORD, Primary Examiner

U.S. Cl. X.R.

260—240 D, 244 R, 326.5, 296 B, 239.3 R, 332.2 H, 346.1 R, 340.3, 340.5, 293.59, 293.61, 247.2 A, 295 K, 243 R, 268 BC; 424—246, 248, 263, 274